April 18, 1939.　　　J. D. SMITH ET AL　　　2,155,153
DIPPER SHOVEL, CHUTE, AND CROWDER ATTACHMENT FOR DREDGING PURPOSES
Filed Jan. 24, 1938　　　2 Sheets-Sheet 2
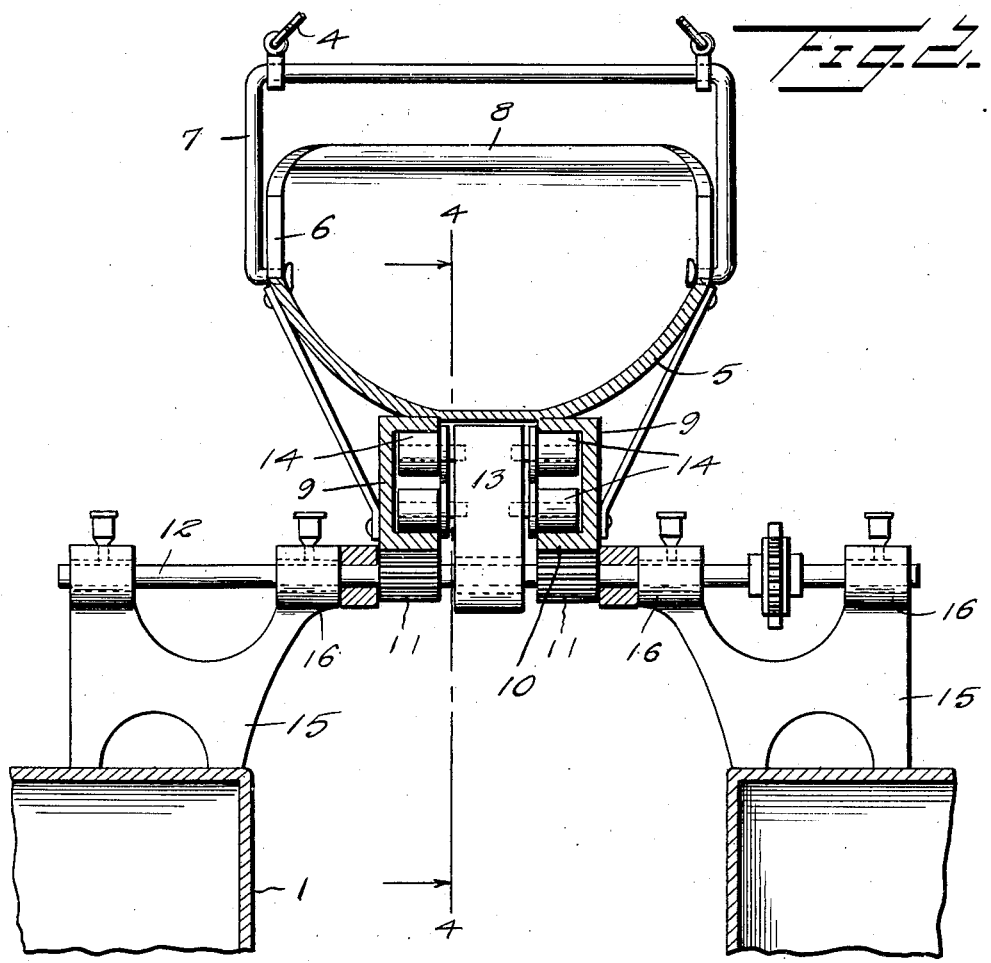
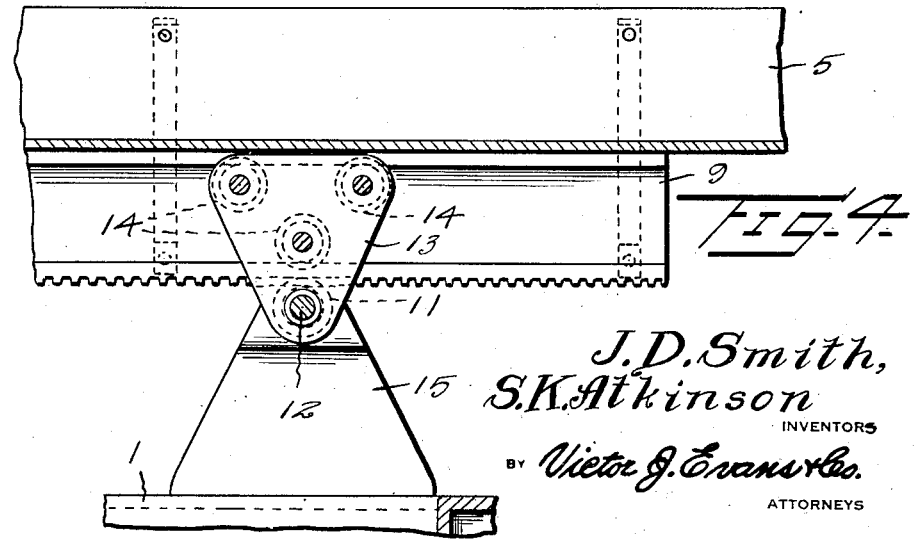

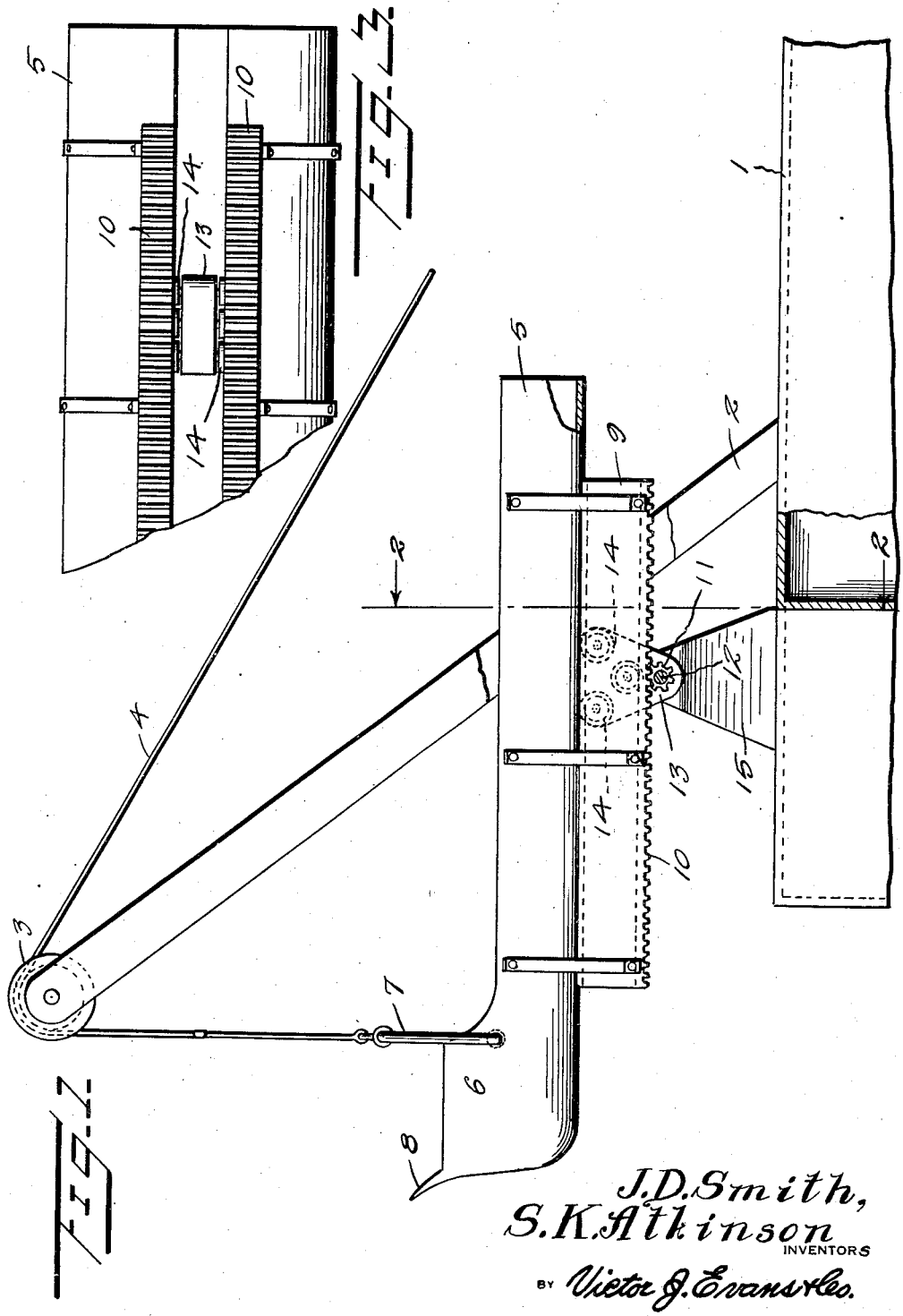

Patented Apr. 18, 1939

2,155,153

UNITED STATES PATENT OFFICE 2,155,153

DIPPER SHOVEL, CHUTE, AND CROWDER ATTACHMENT FOR DREDGING PURPOSES

John D. Smith and Sheridan K. Atkinson, Boise, Idaho

Application January 24, 1938, Serial No. 186,738

1 Claim. (Cl. 37—71)

This invention relates to a dipper shovel, chute and crowder attachment for dredging devices and has for the primary object the provision of combining in a single unit a shovel type bracket and a chute, constituting a boom operating in conjunction with a crowder mechanism similar in construction to a crowder arrangement on an excavating power shovel whereby placer formations containing precious materials in large boulders and the like may be easily excavated either above or below water level and deposited by gravity in a receiver for the usual processing to recover the desirable materials from the undesirable materials.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary side elevation, partly in section, showing the present invention mounted on a pontoon.

Figure 2 is a transverse sectional view taken on line 2—2 of Figure 1.

Figure 3 is a fragmentary bottom plan view showing the present invention associated with a part of a crowder mechanism.

Figure 4 is a sectional view taken on line 4—4 of Figure 2.

Referring in detail to the drawings, the numeral 1 indicates the pontoon, barge or the like on which the dredge apparatus is supported as well as material refining means (not shown). 2 indicates a gantry, 3 a gantry sheave over which a hoisting cable 4 is trained and operable by a hoisting mechanism (not shown). The parts described are referred to briefly for the purpose of disclosing clearly the present invention.

A chute 5 of rigid construction and of substantially U shape in cross section has integral with one end a shovel bucket 6 equipped with a bail 7 to which the hoisting cable 4 is secured and is provided at its working edge with a lip 8 tapered toward its free edge to facilitate the biting of the bucket into materials. Secured to and paralleling the bottom of the chute 5 is a boom 9 of channeled formation and including spaced rack bars 10 to mesh with pinions 11 secured on a reversible shaft 12 forming part of a crowder mechanism. Included in the crowder mechanism is a bearing member 13 carrying pairs of rollers 14 engageable with the channels of the boom for slidably supporting the boom, chute and shovel, the boom fulcruming on the pinions 11 so that raising and lowering of opposite ends of the chute on a horizontal pivot may be had. The crowder mechanism further includes supports 15 provided with journals 16 to rotatably support the shaft 12. The shovel 6, chute and boom comprise a single unit which is capable of being driven forwardly and rearwardly by the crowder arrangement and raised and lowered through the hoisting cable 4. This unit is operable preferably at the front end of the pontoon.

In operation, the hoisting cable 4 is slackened, allowing the bucket to lower into engagement with the material, the crowder mechanism is then operated to drive the chute and bucket forwardly into the material. The hoisting cable is then tightened, elevating the bucket and chute to assume an inclined position so that the materials collected by the shovel may gravitate therefrom through the chute into a well or receiver on the pontoon for the usual processing to separate the precious material from the undesirable material. Constructing the shovel, chute and boom in a single unit permits excavating or dredging of placer formation, that is, formations of large boulders containing precious ore or mineral, with ease, economy and safety heretofore impossible with the type of dredging devices now in use.

What is claimed is:

A device of the character described, comprising, a boom fashioned with spaced channel members provided with rack bars and fashioned with upper and lower tracks, a reversible operating shaft mounted in proximity to said boom, pinions fixed on said shaft and meshing with said rack bars for actuating said boom, a bearing element pivotally mounted on said shaft between said pinions and extending between said channel members, upper and lower rollers rotatably mounted on said bearing element and extending within said channel members and engaging said upper and lower tracks respectively whereby to maintain said boom pivotally connected to said shaft for operation at all times by said pinions.

JOHN D. SMITH.
SHERIDAN K. ATKINSON.